United States Patent Office 3,419,508
Patented Dec. 31, 1968

---

3,419,508
CELLULOSE SURFACES AND METHOD OF TREATING
Maurice E. Grenoble, Ballston Lake, N.Y., assignor to General Electric Company, a corporation of New York
No Drawing. Filed Sept. 17, 1965, Ser. No. 488,234
9 Claims. (Cl. 260—18)

ABSTRACT OF THE DISCLOSURE

Cellulose surfaces are treated with a stable but rapid curing abhesive composition comprising a silanol chain-stopped silicone fluid, a methylhydrogen siloxane fluid, an organotin compound, such as dibutyl tin dilaurate, and a titanate ester, such as tetrabutyl titanate.

---

This invention relates to the treatment of cellulose surfaces. More particularly, this invention is concerned with the treatment of cellulose surfaces to make them non-adherent to normally adherent surfaces. In recent years, materials such as polyethylene-coated paper have been employed for the production of cartons for packaging milk. In order to make these cartons easily usable by the consumer, it is necessary that the spout area be opened easily. At the same time, of course, it is important that the remaining seams of the carton be stable and resistant to splitting or leaking. To allow opening of the sprout area, silicone abhesives have been applied to prevent the resinous surfaces in the spout area from adhering during the heat sealing of the remainder of the carton.

The abhesive which is applied to the sprout area must cure rapidly and completely. The machines which are employed to form resin-coated paper milk cartons, such as polyethylene coated paper cartons, print the packager's design on the flat stock, print the silicone abhesive onto the stock by a similar procedure, cure the printed coatings by a rapid pass through an oven, and cut the stock, prior to the forming and sealing of the final carton. The cut stock is stacked prior to feeding to the forming and sealing machine. If a rapid and permanent cure of the silicone abhesive is not obtained, there is physical damage to the abhesive layer. A faulty carton results from this physical damage as either too little silicone is left at the spout area for release, some of the silicone is spread to areas which must be heat sealed resulting in leaky seals, or both.

The silicone abhesive coating is normally in the range of from 0.1 to 2 microns in thickness. Most often, this coating is in the range of from 0.1 to 0.5 micron. The thicker coatings, that is those in the range of about 1 to 1.5 microns are the most difficult to cure rapidly. However, with the curing agent system of the present invention even films of this thickness can be cured rapidly. The heat which is applied to the silicone coating is generally from about 250° to 450° F. However, the dwell time in the oven is extremely short, usually from about 4 to 5 seconds. It has been found that using the curing agent system of the present invention complete cure can be accomplished even in this short time.

Many systems have been shown in the prior art for curing organopolysiloxane films. For example, in U.S. Patent 2,985,546, Leavitt, a system is shown which consists essentially of a linear polydimethylsiloxane having terminal silicon-bonded hydroxy groups, a polyalkylsilicate, dibutyl tin dilaurate or dibutyl tin diacetate, and an organic solvent. While this system is completely adequate for many uses, it does not cure quickly enough for use in the present application. Similarly, in U.S. Patent 2,902,467, Chipman, a system is shown comprising an organopolysiloxane with silicon-bonded hydroxyl groups, a particular organosilicate, and a carboxylic acid salt of a metal above hydrogen in the electromotive series. Again, the cure is not effected rapidly enough for utility in the present application. Still further, the curing of hydroxyl-terminated diorganopolysiloxanes with a mixture of a silicic ester and a titanic or zirconic ester is described in U.S. Patent 3,151,099, Ceyzeriat et al. While cure is effected with this system in the presence of moisture, a nonsmearing film is not formed with enough rapidity to allow use in the present system.

Unexpectedly, I have found a particular curing system which will cure a hydroxyl-terminated diorganopolysiloxane to a smearproof state in only a few seconds, while still allowing formation of a solution with hydroxyl-terminated organopolysiloxane having a long enough potlife for ease of employment. Briefly, my curing system consists of particular organotin compounds and particular titanate esters, in a critical ratio, which provide a rapid cure of a hydroxyl-terminated diorganopolysiloxane.

The organotin compounds which are utilizable as a portion of the curing system of the present invention are those having the formula:

(1) 
$$R_nSn(OR')_{4-n}$$

where R is an alkyl radical of from 1 to 4 carbon atoms, R' is the residue of a fatty acid having from 2 to 18 carbon atoms, and n is an integer of from 1 to 2, inclusive. Among the specific organotin compounds which can be used are dibutyl tin dilaurate, dibutyl tin dioctoate, dibutyl tin diacetate, dibutyl tin dimaleate, monobutyl tin triacetate, etc. The preferred tin compound is dibutyl tin dilaurate.

Only a narrow range of titanate esters are useful in the present invention. Those titanate esters which can be employed are selected from the class consisting of tetraethyltitanate, tetrapropyltitanates, and tetrabutyltitanates. It has been found that tetraalkyltitanates having longer chain alkyl radicals do not provide the rapid cure which is desired in the present application. Thus, for example, when tetrakis(2-ethylhexyl)titanate was utilized in combination with the above mentioned organotin compounds, rapid cure was not achieved, but rather the silicone film smeared after passing through the carton printing machine.

Without the organotin compound, the composition will cure as rapidly as with the tin compound-titanate ester composition, but the cured system is subject to hydrolysis, even by normal humidity. If the titanate ester is not present, the system does not cure rapidly enough. Thus, it is only with the combination of the two members of the curing system of the present invention that the rapidly cured, lasting film is obtained.

The organotin compound should comprise from 10% to 50% of the combined curing system and the titanate esters should comprise from 90% to 50% of the combined curing system. The preferred ratio is about 2:1 of tetraalkyltitanate to organotin compound.

The curing agent system just described is useful for curing hydroxyl-terminated organopolysiloxanes in a wide variety of media. Preferably, the hydroxyl-terminated diorganopolysiloxane is contained in a solution having the following constitutents:

| | Percent |
|---|---|
| Hydroxyl-terminated diorganopolysiloxane | 1–30 |
| Organosilicates | 0–5 |
| Organopolysiloxane fluid having both methyl substituents and silicon bonded hydrogen substituents | 0.05–5 |
| Solvent | Remainder |

The hydroxyl-terminated dimethylpolysiloxane fluid is well known in the art and can be prepared by a variety of methods such as those shown in U.S. Patent 2,843,555, Berridge, that part of that patent being herein incorporated by reference. Similarly, a wide variety of organosilicates having the formula Si(OR″)₄, where R″ represents an alkyl group of from 1 to 18 carbon atoms, can be employed. For example, the silicate can be tetraethylsilicate, tetra n-propyl silicate, tetrabutyl silicate, tetra 2-ethylhexylsilicate, or the R″ groups can be a mixture of alkyl groups.

The organopolysiloxane containing both methyl substituents and silicon-bonded hydrogen substituents is also well known in the art and is described, for example, in U.S. Patent 2,491,843, Wilcock. The fillers which can be employed in the solution containing the diorganopolysiloxanes are any of the natural or synthetic silicas, such as, silica aerogels, fumed silica, ground quartz, and finely divided silica treated with organosilicon materials, e.g., trimethylchlorosilane, etc. The silica fillers treated with organosilicon materials are described, e.g., in U.S. Patents 2,938,009, Lucas, and 3,004,859, Lichtenwalner.

A wide variety of solvents can be employed to form the solutions just described. Particularly, the solvents can be aromatics such as benzene or toluene. Additionally solvents such as tetrahydrofuran, esters such as ethyl acetate, ketones such as methylethylketone, and substituted aromatic compounds such as chlorobenzene can be utilized. Similarly, a mixture of these solvents can be employed. Preferably, if it is desired to extend the pot-life of the solution, a carbonyl or alcohol solvent is employed. For optimum performance, the solvent should have a low boiling point, for example, less than about 135° C.

The amount of the organotin compound-titanate ester curing system which is employed in relation to the polyorganosiloxane solution is not narrowly critical. Thus, from about 0.5 to 10 parts of the curing agent system can be used with each 100 parts of the previously described solution. Preferably, the solution contains from about 3% to 10% of a hydroxyl-terminated dimethylpolysiloxane fluid, less than 1% of the organosilicates, less than 2% of the polyorganosiloxane fluid having both methyl substituents and silicon-bonded hydrogen substituents, and from 1% to 3% of the silica fillers. With such a solution, the curing agent composition is preferably employed in an amount of about 0.75 to 3 parts per 100 parts of the solution.

It has been found that solutions containing the hydroxyl-terminated polyorganosiloxane remain stable for up to 6 weeks when the curing agent system of the present invention has been added. However, for optimum utility, and to assure proper functioning of the solution, the curing system should not be added more than about 72 hours prior to the time that the solution is applied to the treated cellulose surface.

In order that those skilled in the art may better understand the practice of the present invention the following examples are given as illustrations. These examples should not be considered as limiting in any way the full scope of the invention as covered in the appended claims.

Example 1

A solution containing a hydroxyl-terminated dimethylpolysiloxane was formulated as follows:

| | Percent |
|---|---|
| Hydroxyl-terminated dimethylpolysiloxane having a viscosity of 500,000 csts. | 4.0 |
| Polysiloxane with a viscosity of 25 centistokes having approximately 99% methyl substituents and 1% silicon bonded hydrogen substituents | 0.5 |
| Tetraethylorthosilicate | 0.5 |
| Fumed silica | 1.0 |
| Ethyl acetate | 47.0 |
| Toluene | 47.0 |

To a portion of this solution was added about 0.25% of dibutyl tin dilaurate, based on the solution weight. A second portion was catalyzed with about 0.75% of a 2:1 mixture of tetrabutyltitanate and dibutyl tin dilaurate. Polyethylene-coated milk carton stock was printed with the packager's design and 25 cartons were coated with each of the two catalyzed solutions. These cartons were immediately heat sealed and tested for ease of opening at the spout area. A rating system was established such that the value 1 was assigned to those which were easily opened and a value of 5 to those where poor release was obtained in the spout area. The cartons coated with solution catalyzed only by dibutyl tin dilaurate gave an opening value of 2.3, while those coated with the solution catalyzed by the tetrabutyltitanate-dibutyl tin dilaurate curing system showed a value of 1.1, indicating extreme ease of opening.

Example 2

A second solution containing the hydroxyl-terminated dimethylpolysiloxane was formulated as follows:

| | Percent |
|---|---|
| Hydroxyl-terminated dimethylpolysiloxane having a viscosity of 200,000 csts. | 5.00 |
| Organopolysiloxane with both methyl substituents and silicon-bonded hydrogen substituents | 0.50 |
| Tetraethylorthosilicate | 0.25 |
| Toluene | 94.25 |

The organopolysiloxane with both methyl substituents and silicon-bonded hydrogen substituents was the same as that used in Example 1. This solution was separated into three portions which were catalyzed as indicated below:

Part 1—Dibutyl tin dilaurate
Part 2—Tetrabutyltitanate-dibutyl tin dilaurate in a ratio of 3:1
Part 3—Tetrabutyltitanate Each of these solutions was coated on milk carton stock to a wet thickness of 1 to 2 mils and was cured for 5 seconds at 400° F. The cartons were immediately checked for smear of the silicone coating by rubbing the treated area. The cartons coated with Parts 2 and 3 of the solution showed no smear, while the cartons coated with Part 1 of the solution gave a slight smear. The coatings were then aged at room temperature for 24 hours and rechecked for smear. After this aging, the only cartons which showed no smear in the silicone-treated area were those cartons which were treated with Part 2 of this solution, that is the part of the solution which was catalyzed with the curing system of the present invention.

Example 3

To further show the utility of solutions catalyzed according to the present invention, treating baths were prepared and the viscosity change over a period of time determined. The solution had the following composition:

| | Percent |
|---|---|
| Hydroxy - terminated dimethylpolysiloxane with a viscosity of 1,000,000 csts. | 4.00 |
| Organopolysiloxane with both methyl substituents and silicon-bonded hydrogen substituents | 0.25 |
| Tetrathylorthosilicate | 0.75 |
| Methylethylketone | 47.5 |
| Toluene | 47.5 |

The organopolysiloxane with both methyl substituents and silicon-bonded hydrogen substituents was the same as that used in Example 1. A first portion of this solution was catalyzed with 0.25% of dibutyl tin dilaurate, while a second portion was catalyzed with 1.0% of a mixture of tetrabutyltitanate and dibutyl tin dilaurate in a ratio of 4:1. The initial viscosity of the dibutyl tin dilaurate catalyzed portion was 9.5 centistrokes while the second portion of the solution, catalyzed with the curing system of the present invention, showed a viscosity of 10 centistokes. Each of the solutions was stored in a sealed container at room temperature and the viscosities were rechecked after two weeks and after four weeks. Part 1 of the solution had gelled within two weeks, while after four weeks the second part of the solution, catalyzed with the curing system of the present invention, had risen in viscosity to only 13 centistokes.

Thus, a curing system has been developed which rapidly cures silicone abhesive coatings. It should be apparent that this coating system is applicable, not only to polyethylene-coated cellulosic cartons, but, in addition, to a wide variety of other materials where silicone coatings, which must cure rapidly, are desired. For example, these abhesives can be used on various tapes which carry a permanent abhesive on one surface to prevent that surface from sticking to the adjacent tape layer. Vulcanized or unvulcanized sheets of rubber can be prevented from adhering to each other despite the fact they are quite sticky and cohesive when they come in direct contact with each other in the absence of the coating. Paper can be treated, in accordance with the present invention, which is useful in lining various boxes of partially prebaked goods such as buns, rolls, and the like, with little danger of the abhesive being absorbed by the food product.

Additionally, the system can be employed to coat cellulosic fabrics so as to provide water repellency. For example, a cotton cloth treated with the catalyzed solution designated as Part 2 of Example 2 showed a spray rating of 90+.

What I claim as new and desire to secure by Letters Patent of the United States is:

1. A method for rendering cellulosic material non-adherent to surfaces which normally adhere thereto comprising treating the material with 100 parts of a solution containing:
   (1) from 1% to 30% of a hydroxyl-terminated diorganopolysiloxane fluid,
   (2) from 0 to 5% organosilicates,
   (3) from 0.05% to 5% of a polysiloxane fluid having both methyl substituents and silicon-bonded hydrogen substituents,
   (4) from 0 to 5% silica filler, and
   (5) the remainder solvent,
and from 0.5 to 10 parts of curing agent system consisting of:
   (1) from 10% to 50% of an organotin compound having the formula:

$$R_nSn(OR')_{4-n}$$

where R is an alkyl radical of from 1 to 4 carbon atom, R' is the residue of a fatty acid having from 2 to 18 carbon atoms, and $n$ is an integral number of from 1 to 2, inclusive, and
   (2) from 90% to 50% of a titanate ester selected from the class consisting of tetraethyltitanate, tetrapropyltitanates, and tetrabutyltitanates.

2. The mehod of claim 1 wherein the solution contains:
   (1) from 3 to 10% of a hydroxyl-terminated dimethylpolysiloxane fluid,
   (2) less than 1% organosilicates,
   (3) less than 2% of the polysiloxane fluid having both methyl substituents and silicon-bonded hydrogen substituents,
   (4) from 1% to 3% silica fillers, and
   (5) the remainder solvent.

3. The process of claim 1 wherein the curing agent system is applied in an amount of from 0.75 to 3 parts.

4. The method of claim 1 wherein the titanate ester and the organotin compound are in the ratio of 2:1 in the curing agent system.

5. The method of claim 1 wherein the organotin compound is dibutyl tin dilaurate and the titanate ester is tetrabutyltitanate.

6. A composition of matter for application to a cellulosic surface to render that surface nonadherent comprising 100 parts of a solution containing:
   (1) from 1% to 30% of a hydroxyl-terminated diorganopolysiloxane fluid,
   (2) from 0 to 5% organosilicates,
   (3) from 0.05% to 5% of a polysiloxane fluid having both methyl substituents and silicon-bonded hydrogen substituents,
   (4) from 0 to 5% silica fillers, and
   (5) the remainder solvent,
and a curing agent system in an amount of from 0.5 to 10 parts consisting of:
   (1) from 10% to 50% of an organotin compound having the formula:

$$R_nSn(OR')_{4-n}$$

where R is an alkyl radical of from 1 to 4 carbon atom, R' is the residue of a fatty acid having from 2 to 18 carbon atoms, and $n$ is an integral number of from 1 to 2, inclusive, and
   (2) a titanate ester selected from the class consisting of tetraethyltitanate, tetrapropyltitanaes, and tetrabutyltitanates.

7. The composition of claim 6 wherein the solution contains:
   (1) from 3% to 10% of hydroxyl-terminated dimethylpolysiloxane fluid,
   (2) less than 1% organosilicates,
   (3) less than 2% of a polysiloxane fluid having both methyl substituents and silicon-bonded hydrogen substituents,
   (4) from 1% to 3% silica fillers, and
   (5) the remainder solvent.

8. The composition of claim 6 wherein the curing agent system consists of the titanate ester and the organotin compound in a ratio of 2:1.

9. The composition of claim 6 wherein the organotin compound is dibutyl tin dilaurate and the titanate ester is tetrabutyltitanate.

References Cited

UNITED STATES PATENTS

| | | | |
|---|---|---|---|
| 3,262,830 | 7/1966 | Vincent | 117—155 X |
| 3,127,363 | 3/1964 | Nitzsche et al. | 260—18 |

FOREIGN PATENTS

| | | |
|---|---|---|
| 844,128 | 8/1960 | Great Britain. |

DONALD E. CZAJA, *Primary Examiner.*

C. W. IVY, *Assistant Examiner.*

U.S. Cl. X.R.

117—155, 143, 15, 76; 260—46.5, 37, 32.8, 33.4, 37